May 17, 1966  R. F. McCAULEY  3,251,423

FURROW LEVELER FOR CULTIVATORS

Filed Oct. 8, 1964

Royal F. McCauley
INVENTOR.

BY *Clarence A. O'Brien*
*and Harvey B. Jackson*
Attorneys

United States Patent Office 3,251,423
Patented May 17, 1966

3,251,423
FURROW LEVELER FOR CULTIVATORS
Royal F. McCauley, R.F.D. 3, Fort Dodge, Iowa
Filed Oct. 8, 1964, Ser. No. 402,565
6 Claims. (Cl. 172—159)

This invention generally relates to tractor cultivators and has for its primary object to provide, in a manner as hereinafter set forth, novel means for leveling the usual furrow left by the rear center sweep or shovel of such implements.

Another highly important object of the present invention is to provide a furrow leveling device of the aforementioned character which is adapted to be expeditiously mounted for operation on the rear center shank of the cultivator.

Another important object is to provide a furrow leveling attachment of the character set forth which may be successfully used in different kinds or types of soil and which, further, may be readily adjusted as desired to meet various conditions.

Another important object is to provide an attachment of the character set forth comprising unique means for adjustably clamping the device to the cultivator shank.

Other objects are to provide a furrow leveling attachment for cultivators which is comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
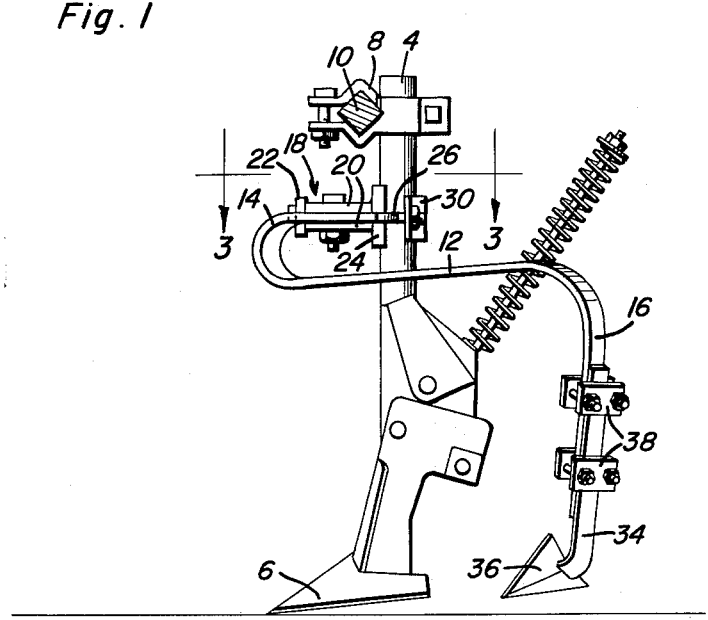
FIGURE 1 is a view in side elevation, showing a furrow leveler embodying the present invention installed on a cultivator shank.
Figure 2:
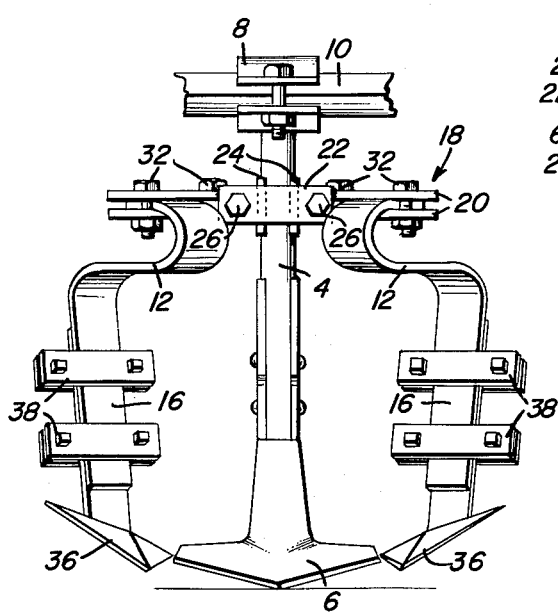
FIGURE 2 is a view in front elevation thereof.

Referring now to the drawing in detail, it will be seen that reference numeral 4 designates the usual rear center shank of a tractor cultivator. The shank 4 has mounted on its lower end portion the usual sweep or shovel 6. A clamp 8 secures the shank 4 on the tool bar 10 of the implement.

The embodiment of the present invention which has been illustrated comprises a pair of generally horizontal, rearwardly divergent spring arms 12 of suitable resilient metal on opposite sides of the shank 4. The arms 12 include upwardly and reversely bent forward end portions 14. Then, the spring arms 12 terminate in downwardly bent rear end portions 16.

Figure 3:
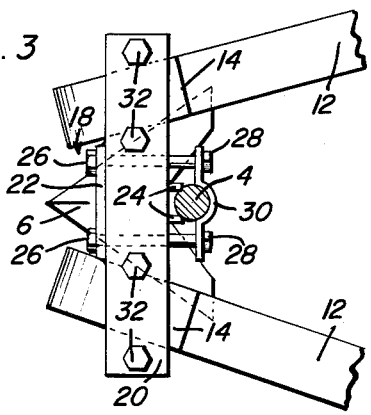
FIGURE 3 is a view in horizontal section, taken substantially on the line 3—3 of FIGURE 1.

A clamp 18 detachably and adjustably secures the arms 12 on the upper portion of the shank 4. The clamp 18 comprises a pair of flat, opposed metallic plates or bars 20 which are vertically spaced from each other sufficiently to slidably adjustably receive the end portions 14 of the arms 12 therebetween. A vertical plate 22 is welded to the intermediate portions of the front edges of the bars 20. Welded to the rear edges of the plates or bars 20 is a pair of ribs or the like 24 which are sufficiently spaced from each other to wedgingly receive the shank 4 therebetween in the manner shown to advantage in FIGURE 3 of the drawing. It will be noted that the plate 22 is of considerably less length than the plates or bars 20. The end portions of the plate 22 are apertured to accommodate bolts 26 which extend rearwardly between the bars 20 on opposite sides of the shank 4. Nuts 28 on the rear end portions of the bolts 26 clamp a bar or jaw 30 against the shank 4. Pairs of spaced bolts 32 in the bars 20 receive the end portions 14 of the arms 12 therebetween and provide means for clamping the end portions of said bars 20 on said arms.

Removably and adjustably mounted on the lower end portions 16 of the arms 12 are shanks 34. Forwardly and inwardly inclined shovels or tools 36 are mounted on the lower end portions of the shanks 34. Clamps 38 adjustably and removably secure the shanks 34 on the end portions 16 of the arms 12.

It is thought that the operation of the device will be readily apparent from a consideration of the foregoing. Briefly, the spring arms 12 are mounted on the shank 4 and secured in adjusted position through the medium of the clamp 18. It will be noted that the construction and arrangement of the clamp 18 is such as to permit substantially universal adjustment of the arms 12. Then, the shanks 34 with the tools 36 thereon are vertically adjusted to the desired position on the end portions 16 of the arms 12 and secured through the medium of the clamps 38. As will be understood, as the implement moves forwardly in the usual manner the forwardly and inwardly inclined shovels or tools 36 throw the soil inwardly and level the usual furrow left by the center rear shovel 6 of the cultivator. The end portions of the flat metallic plates or bars 20 function as jaws which frictionally clamp the end portions 14 of the spring arm 12 in adjusted position therebetween. The loose, leveled soil left by the attachment retains the moisture and facilitates combining, cultivating and corn picking operations. It will be noted that the shovels 36 are spaced rearwardly and laterally outwardly from the sweep or shovel 6 for engaging and returning the soil thrown outwardly thereby.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A furrow leveler for cultivators having a rear center shank and a sweep thereon, said leveler comprising a pair of generally horizontal, rearwardly divergent resilient arms including downturned rear end portions, a pair of leveling shovels, means adjustably securing said leveling shovels on the rear end portions of the arms in rearwardly and outwardly laterally spaced relation to the sweep, and means for adjustably and removably mounting the arms on the shank, the last-named means comprising a clamp including a pair of flat, opposed, vertically spaced metallic bars extending horizontally across the front of the shank, an apertured vertical plate affixed longitudinally to the front edges of the bars, a pair of bolts mounted in the end portions of the vertical plate and extending rearwardly therefrom between the bars and on opposite sides of the shank, and a jaw on the bolts engaged with the rear of the shank, the end portions of the bars receiving and frictionally gripping the arms therebetween.

2. A furrow leveler in accordance with claim 1, said clamp further including pairs of spaced bolts in the end portions of the bars receiving the arms therebetween and providing means for clampingly engaging said bars with said arms.

3. A furrow leveler in accordance with claim 1, said arms extending beneath the clamp and further including upwardly and reversely bent forward end portions engaged between the end portions of the bars.

4. A furrow leveler in accordance with claim 1, said clamp still further including ribs fixed vertically on the rear edges of the bars and spaced from each other for wedgingly receiving the shank therebetween.

5. A furrow leveler in accordance with claim 1, the first-named means comprising shanks mounted longitudinally on the arms, and clamps securing the shanks and the arms together in adjusted position.

6. A furrow leveler for cultivators having a rear center shank and a sweep thereon, said leveler comprising at least one generally horizontal, rearwardly extending resilient arm including a downturned rear end portion, a leveling shovel, means adjustably securing said leveling shovel on the rear end portion of said arm in rearwardly and outwardly laterally spaced relation to the sweep, and means for adjustably and removably mounting the arm on the shaft, the last-named means comprising a clamp including a pair of flat, opposed, vertically spaced metallic bars extending horizontally across the front of the shank, an apertured vertical plate affixed longitudinally to the front edges of the bars, a pair of bolts mounted in the end portions of the vertical plate and extending rearwardly therefrom between the bars and on opposite sides of the shank, and a jaw on the bolts engaged with the rear of the shank, the end portions of the bars receiving and frictionally gripping the arms therebetween.

References Cited by the Examiner
UNITED STATES PATENTS

| 87,060 | 2/1869 | Muir | 172—654 |
| 965,961 | 8/1910 | Swanson | 172—643 X |
| 2,424,014 | 7/1947 | Bobeldyk | 172—705 |

ANTONIO F. GUIDA, *Acting Primary Examiner.*

T. GRAHAM CRAVER, *Examiner.*

J. R. OAKS, *Assistant Examiner.*